United States Patent
Lee et al.

(10) Patent No.: US 8,374,426 B2
(45) Date of Patent: Feb. 12, 2013

(54) APPARATUS AND METHOD FOR ADJUSTING AUTO WHITE BALANCE USING EFFECTIVE AREA

(75) Inventors: Sang Jo Lee, Suwon-si (KR); Young Su Moon, Seoul (KR); Ho Jin Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 994 days.

(21) Appl. No.: 12/382,863

(22) Filed: Mar. 25, 2009

(65) Prior Publication Data

US 2010/0150439 A1 Jun. 17, 2010

(30) Foreign Application Priority Data

Dec. 11, 2008 (KR) ........................ 10-2008-0125747

(51) Int. Cl.
  *G06K 9/40* (2006.01)
  *H04N 9/73* (2006.01)
(52) U.S. Cl. ........................ 382/167; 382/274; 348/223.1
(58) Field of Classification Search .................. 382/167, 382/162, 254, 274; 348/225.1, 224, 1, 222.1, 348/223.1, 228.1, 655, E9.037, E9.051, E9.052; 358/448, 465, 466, 500, 527, 3.06, 3.01, 358/534, 356, 1.9; 345/589
See application file for complete search history.

(56) References Cited

U.S. PATENT DOCUMENTS

| 5,295,204 | A | * | 3/1994 | Parulski | 382/167 |
| 5,329,361 | A | * | 7/1994 | Matsui et al. | 348/655 |
| 5,565,913 | A | * | 10/1996 | Matsui et al. | 348/228.1 |
| 5,751,349 | A | * | 5/1998 | Matsui et al. | 348/228.1 |
| 6,487,309 | B1 | * | 11/2002 | Chen | 382/162 |
| 7,221,393 | B2 | * | 5/2007 | Takakura | 348/223.1 |
| 7,711,186 | B2 | * | 5/2010 | White | 382/167 |
| 7,728,880 | B2 | * | 6/2010 | Hung et al. | 348/223.1 |
| 7,791,649 | B2 | * | 9/2010 | Kim et al. | 348/223.1 |

FOREIGN PATENT DOCUMENTS

| JP | 2002-118857 | 4/2002 |
| JP | 2007-36927 | 2/2007 |
| JP | 2007-53499 | 3/2007 |
| KR | 10-2008-0080224 | 9/2005 |
| KR | 10-2006-0092658 | 8/2006 |

* cited by examiner

*Primary Examiner* — Sheela Chawan
(74) *Attorney, Agent, or Firm* — Staas & Halsey LLP

(57) ABSTRACT

An apparatus and method for auto white balance adjusting using an effective area. The auto white balance adjusting apparatus may extract a grey area from an input image, and select an effective area from the grey area according to color temperature and luminance, thereby performing white balance using the effective area. The auto white balance adjusting apparatus may perform white balance of the input image using image information of the effective area which is a more precise grey area, thereby improving the white balance.

17 Claims, 8 Drawing Sheets

APPARATUS AND METHOD FOR ADJUSTING AUTO WHITE BALANCE USING EFFECTIVE AREA

CROSS-REFERENCE TO RELATED APPLICATIONS

This application claims the benefit of Korean Patent Application No. 10-2008-0125747, filed on Dec. 11, 2008, in the Korean Intellectual Property Office, the disclosure of which is incorporated herein by reference.

BACKGROUND

1. Field

Example embodiments relate to an image process, and more particularly, to an apparatus adjusting an auto white balance that extracts a grey area from an input image, and performs white balancing using image information of an effective area selected from the grey area based on a color temperature and luminance.

2. Description of the Related Art

In general, when an image of an object is taken by an imaging device, such as a digital camera, a digital video camera, and the like, an appearance of a color of the taken image may differ depending on the condition of a variety of light sources, such as a white lamp, a fluorescent lamp, sunlight, and the like. The imaging device may consider RGB components included in light sources having different color temperatures, and thereby may reproduce white including blue when a color temperature of the light source is high, and reproduce white including red when the color temperature of the light source is low. Here, white is an area having a greatest luminance from a grey area.

Accordingly, when the color temperature is changed by the light source, there is a need to adjust white balance to enable grey to be seen as grey. To precisely adjust the white balance, the grey area that is a standard for the adjustment, is required to be precisely detected.

In this instance, when the white balance is adjusted using all data of the grey area, an error of predicting a light source may occur since the grey area includes data of a real light source and also data of a color area adjacent to the light source. Also, an error in predicting a light source may occur due to a color of a dominant object.

Accordingly, a method of extracting a grey area affected by the real light source to precisely adjust the white balance is required.

SUMMARY

According to example embodiments, there may be provided an apparatus of adjusting an auto white balance, the apparatus including a grey area extractor to extract a grey area by dividing an input image into a plurality of areas, an effective area selector to select an effective area with respect to an effect of a real light source, from the grey area, and a white balance performing unit to perform white balance with respect to the input image by determining a white balance parameter from the effective area.

The grey area extractor may include a data sampling unit to perform sampling on at least one pixel data for each of the plurality of areas, an area data calculator to calculate area data for each of the plurality of areas using the sampled pixel data, and a grey area determining unit to determine the grey area from the plurality of areas by color-space converting the area data.

The effective area selector may include an information determining unit to determine color temperature information and luminance information of the grey area, a grey area classifying unit to classify the grey area into color temperature-luminance sections based on the color temperature information and luminance information, and a counting unit to count a number of grey areas included in the color temperature-luminance sections.

The white balance performing unit may include a parameter calculator to calculate area data of the effective area to calculate a white balance parameter based on the area data, and an image corrector to correct the input image by applying the white balance parameter to the input image.

According to example embodiments, there may be provided a method of adjusting an auto white balance performed by an auto white balance adjusting apparatus, the method including extracting a grey area by dividing an input image into a plurality of areas, selecting an effective area with respect to an effect of a real light source, from the grey area, and performing white balancing with respect to the input image, using the auto white balance adjusting apparatus, by determining a white balance parameter from the effective area.

Additional aspects and/or advantages will be set forth in part in the description which follows and, in part, will be apparent from the description, or may be learned by practice of the embodiments.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
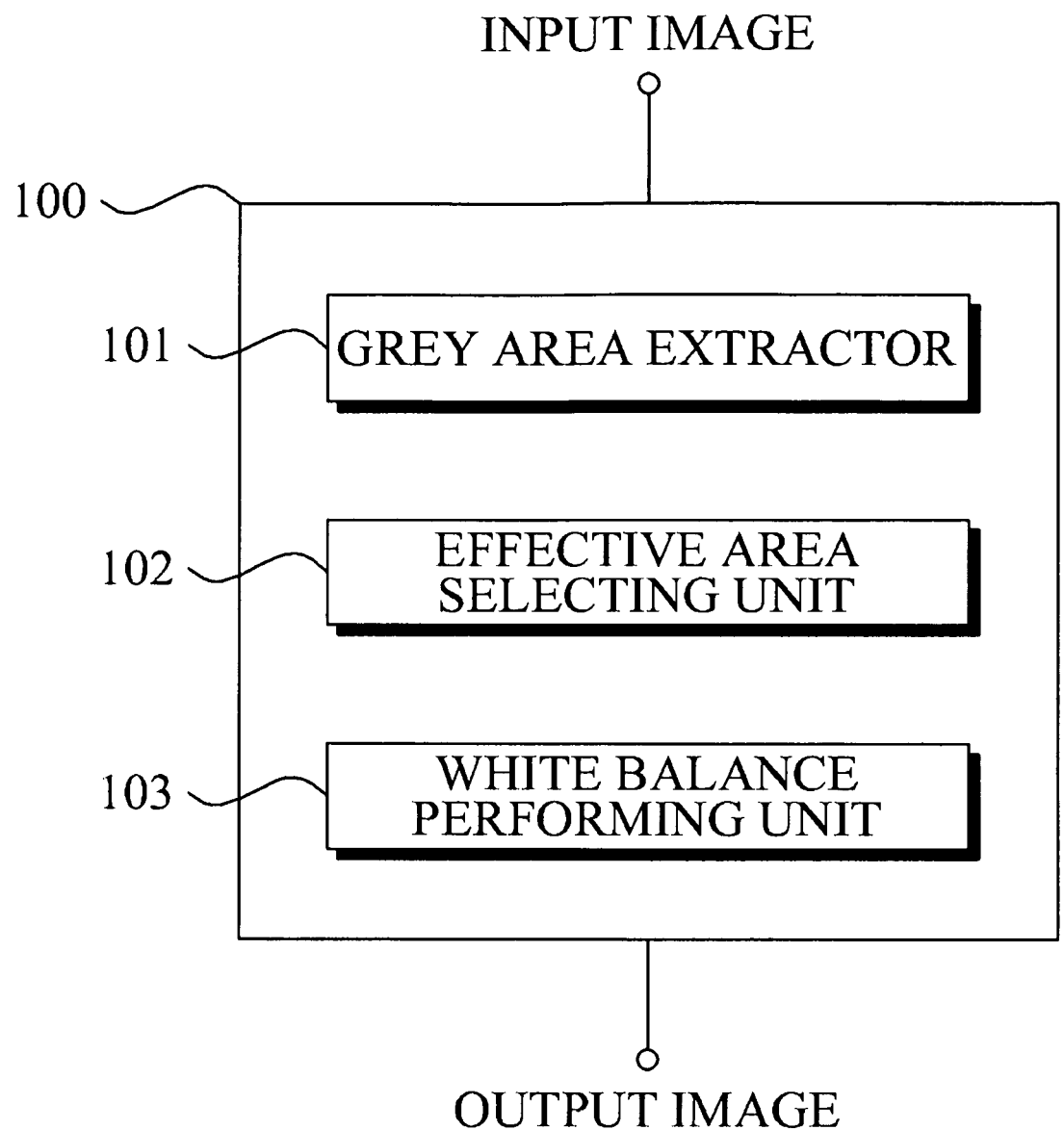
FIG. 1 illustrates a block diagram of an entire configuration of an auto white balance adjustment apparatus according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 illustrates a block diagram of an entire configuration of an auto white balance adjustment apparatus 100 according to example embodiments.

Referring to FIG. 1, the auto white balance adjustment apparatus 100 may include, for example, a grey area extractor 101, an effective area selecting unit 102, and a white balance performing unit 103.

The grey area extractor 101 may divide an input image into a plurality of areas to extract a grey area. White balancing is a process of correcting a grey area of an input image to be seen as real grey, when the grey area, for example, is being discolored due to a light source. In this instance, although the grey area may be replaced with a white area of the input image, white balancing may be performed with respect to the grey area in the example embodiments.

The grey area extractor 101 will be described in detail with reference to FIG. 2.

The effective area selecting unit 102 may select an effective area with respect to an effect of a real light source, from the extracted grey area. When white balancing is performed using all data included in the grey area, an error in predicting a light source may occur. That is, pixel data included in the grey area may include pixel data of the grey area, as opposed to a pixel data of the real light source. Accordingly, the effective area selecting unit 102 may divide the grey area into N sections according to color temperature.

However, a maximum pixel area may be affected by a dominant object. Accordingly, the effective area selecting unit 102 may classify the grey area by color temperature and additionally classify the grey area according to a luminance again. Accordingly, the effective area selecting unit 102 may select the effective area by setting a priority to a luminance section with respect to a color temperature-luminance section. As an example, the effective area selecting unit 102 may select a grey area that is included in a luminance section having a greatest luminance and also included in a color temperature section having a maximum number of grey areas.

The white balance performing unit 103 may perform white balancing with respect to the input image by determining a white balance parameter from the effective area. That is, the white balance performing unit 103 may determine the white balance parameter using image information of the affected area filtered from the grey area according to a color temperature and a luminance, and may perform white balancing by applying the white balance parameter with respect to an entire image.

Figure 2:
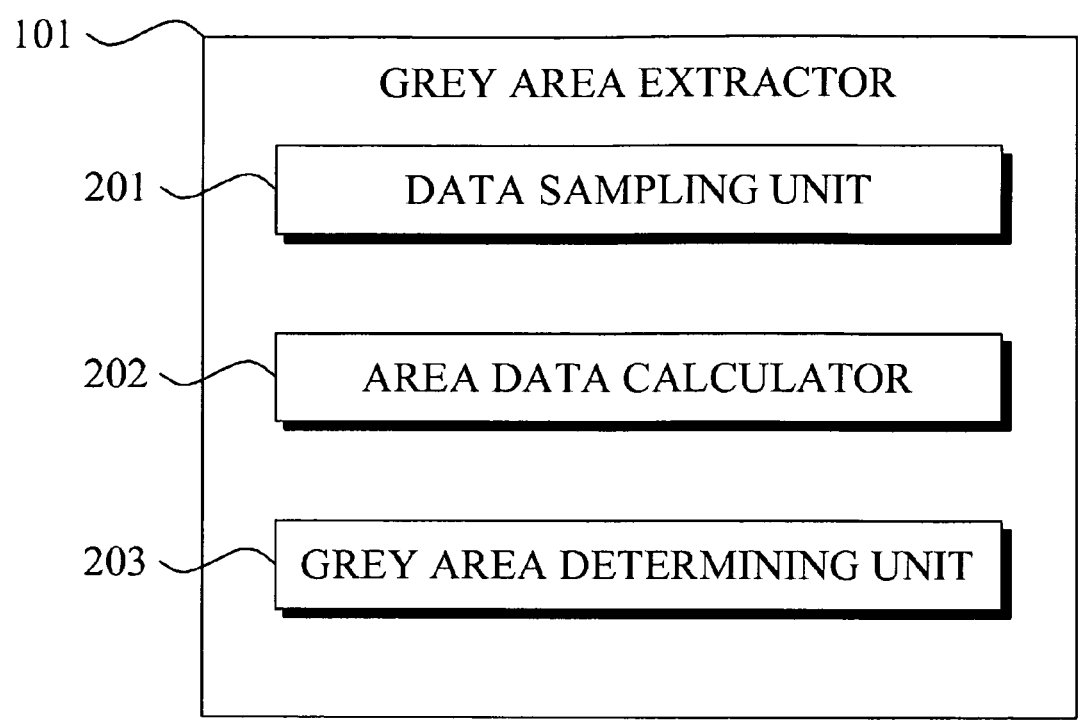
FIG. 2 illustrates a block diagram of a detailed configuration of a grey area extractor of an auto white balance adjustment apparatus of FIG. 1.

FIG. 2 illustrates a block diagram of a detailed configuration of the grey area extractor 101 of the auto white balance adjustment apparatus 100 of FIG. 1.

Referring to FIG. 2, the grey area extractor 101 may include a data sampling unit 201, an area data calculator 202, and a grey area determining unit 203.

The data sampling unit 201 may perform sampling on at least one pixel data for each of the plurality of areas. Particularly, the data sampling unit 201 may extract at least one pixel data for each of the plurality of areas. There is no limit to a position and a number of pixels that may be extracted. In this instance, the data sampling unit 201 may perform sampling on pixel data with respect to each of the plurality of areas by pixel units or by block units, the block unit being a set of pixels.

The area data calculator 202 may calculate area data for each of the plurality of areas using the sampled pixel data. That is, the area data may be data representative for each of the plurality of areas.

As an example, the area data calculator 202 may calculate average R, G, and B area data for each of the plurality of areas using an average red (R), green (G), and blue (B) of the pixel data. Accordingly, average R, G, and B for each of the plurality of areas may be determined.

The grey area determining unit 203 may determine the grey area from the plurality of areas by performing color-space conversion of the area data. As an example, when the average R, G, and B for each of the plurality of areas are determined by the area data calculator 202, the grey area determining unit 203 may convert the area data into YCbCr color-space using the average R, G, and B. Also, the grey area determining unit 203 may determine the grey area according to at least one of converted Y, Cb, and Cr.

A process of determining the grey area from the input image using Y, Cb, and Cr will be described in detail with reference to FIG. 4 later.

Figure 3:
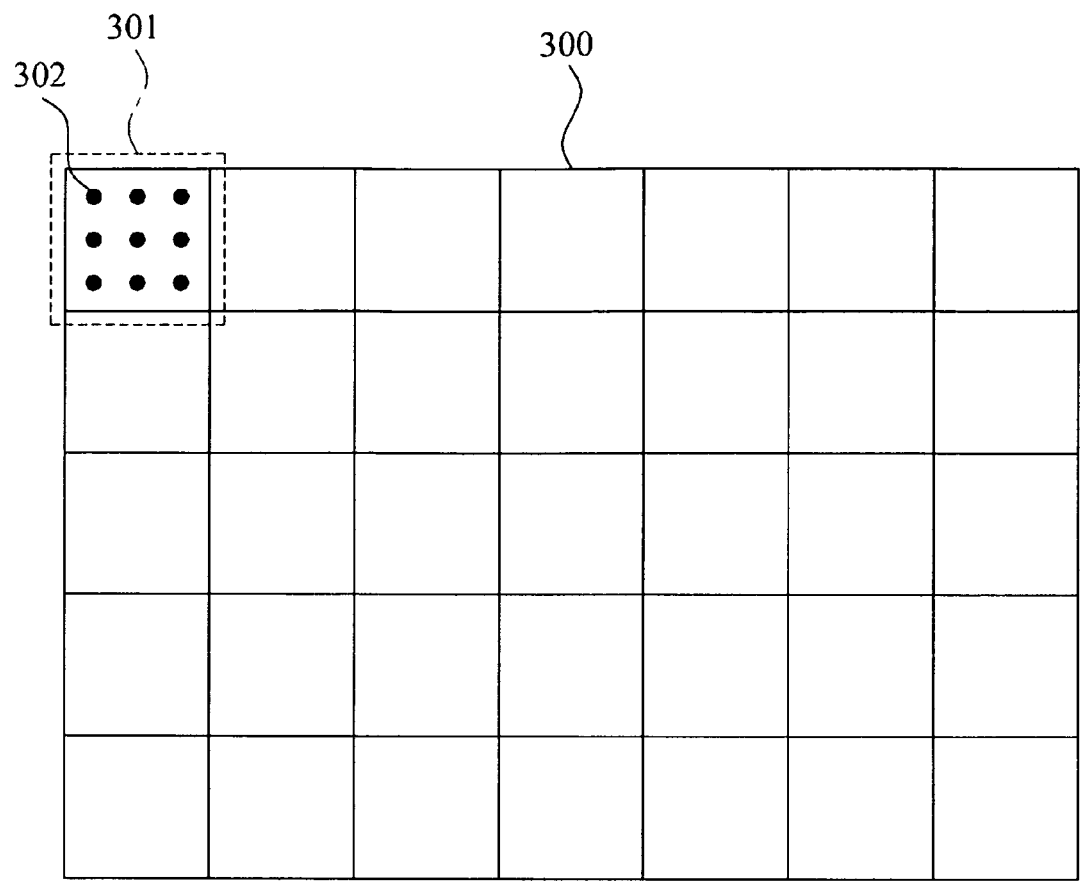
FIG. 3 illustrates an example of sampling a pixel data from a plurality of areas of an input image according to example embodiments.

FIG. 3 illustrates an example of sampling pixel data from a plurality of areas of an input image according to example embodiments.

Referring to FIG. 3, an input area divided into a plurality of areas is illustrated. The input area 300 may be divided into W*H areas. In this instance, an area 301 is one area of the plurality of areas. Also, pixel data 302 is data to be sampled from among pixels data included in the area.

The data sampling unit 201 may perform sampling of at least one pixel data for each of the plurality of areas. There is no limit to a position and a number of pixels that may be sampled. As an example, the data sampling unit 201 may perform sampling on either all pixel data included in an area or on pixel data positioned in a center of the area, among pixel data included in the area.

When pixel data is sampled, area data for each of the plurality of areas may be determined. As an example, the area data may be determined by adding up average R, G, and B of the sampled pixel data for each of the plurality of areas and dividing the same by a number of pixel data. That is, the area data may be an average R, G, and B for each of the plurality of areas.

Figure 4:
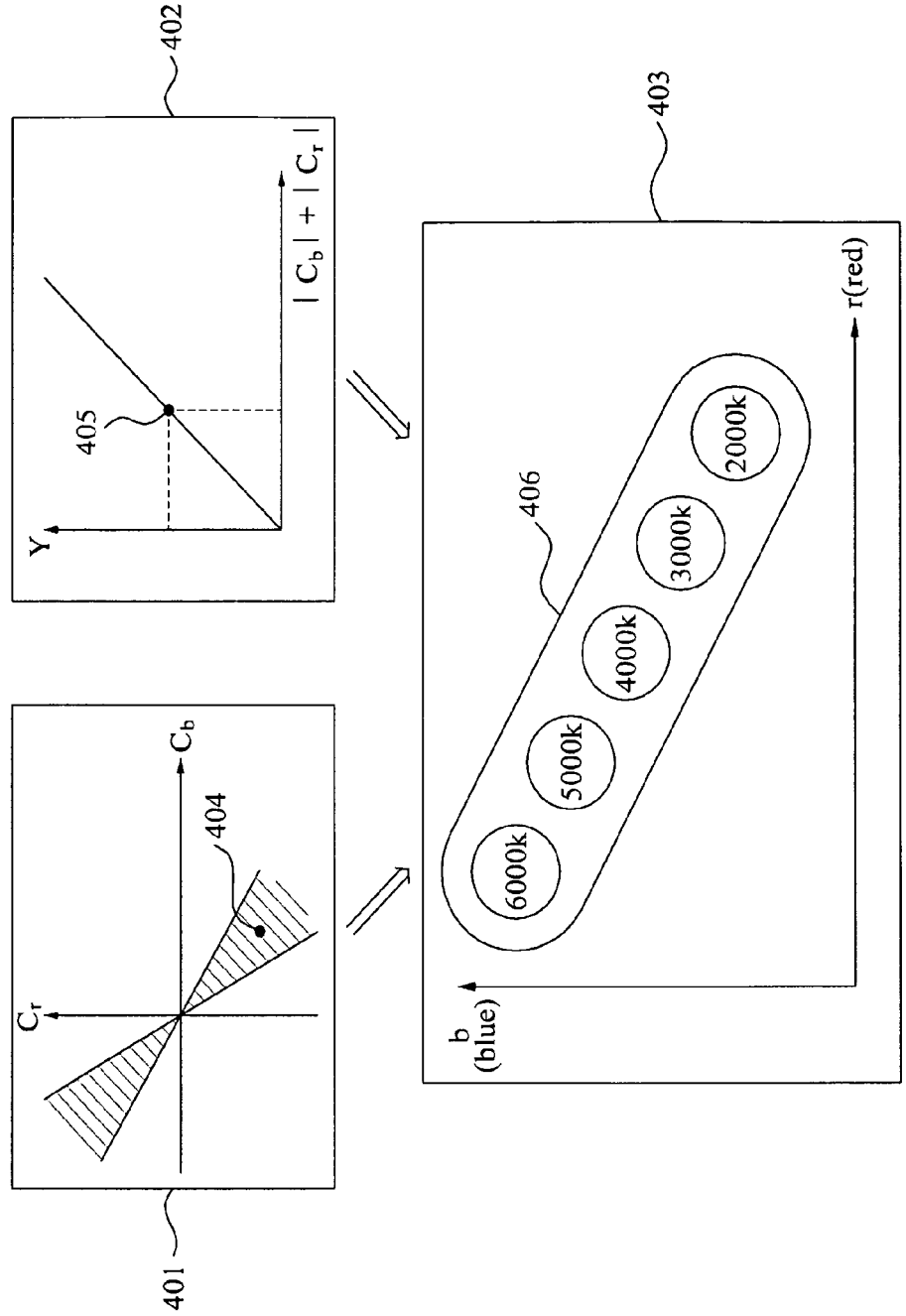
FIG. 4 illustrates a process of extracting a grey area from an input image according to example embodiments.

FIG. 4 illustrates a process of extracting a grey area from an input image according to example embodiments.

FIG. 4 illustrates an example of converting area data into a YCbCr color-space for each of the plurality of areas, and determining the grey area according to at least one of converted Y, Cb, and Cr.

Graph 401 of FIG. 4 illustrates a process of determining a grey area based on a relation between Cb and Cr.

In graph 401, an oblique-lined area indicates a grey area with respect to a light source based on Cb and Cr. The oblique-lined area may vary depending on a type of light source. When the area data 401 is included in the oblique-lined area, an area corresponding to the area data 401, from among the plurality of areas, may be determined as the grey area.

In graph 402 of FIG. 4, a straight line indicates a grey area with respect to a light source based on Y and Cb+Cr. When area data 405 exist on the straight line, an area corresponding to the area data 405 from among the plurality of areas may be determined as the grey area.

The grey area determining unit 203 may determine the grey area from the plurality of areas using color-space converted area data according to graphs 401 and 402.

Graph 403 of FIG. 4 indicates a grey area distributed according to color temperature. A determined grey area 406 may be mapped on a graph between blue (b) and red (r) of the graph 403. As Cb increases, the color temperature is high, and as Cr increases, the color temperature is low.

Figure 5:
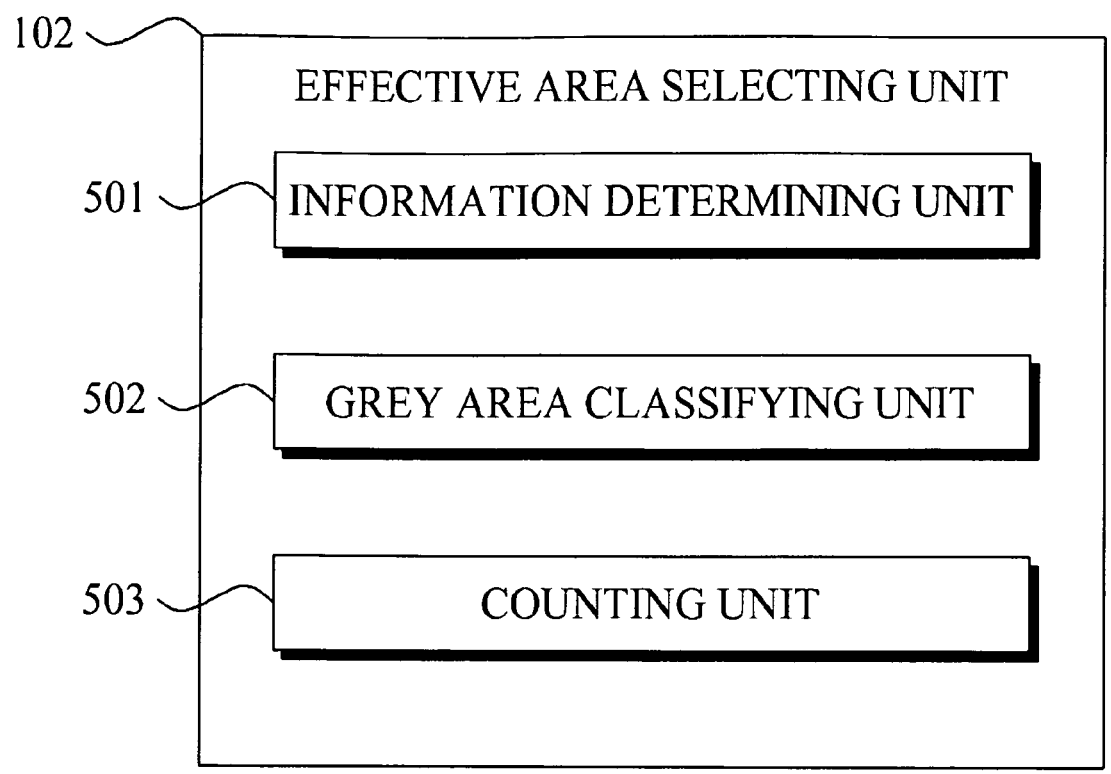
FIG. 5 illustrates a block diagram of a detailed configuration of an effective area selecting unit of an auto white balance adjustment apparatus of FIG. 1.

FIG. 5 is a block diagram illustrating a detailed configuration of the effective area selecting unit 102 of the auto white balance adjustment apparatus 100 of FIG. 1.

Referring to FIG. 5, the effective selecting unit 102 may include, for example, an information determining unit 501, a grey area classifying unit 502, and a counting unit 503.

The information determining unit 501 may determine color temperature information and luminance information of a grey area. In this instance, the information determining unit 501 may determine the color temperature information using Cb and Cr, which are color difference data of the grey area. Also, the information determining unit 501 may determine luminance information using Y, which is luminance data of the grey area. The color temperature information and luminance information of the grey area may be determined based on a YCbCr color-space conversion result of area data. Accordingly, the color temperature and luminance in the grey area may be compared with each other.

The grey area classifying unit 502 may classify the grey area into color temperature-luminance sections based on the color temperature information and luminance information.

A color temperature-luminance section indicates a section for classifying the grey area according to the color temperature and the luminance. In this instance, the color temperature and the luminance may be divided into a plurality of sections. That is, the grey area classifying unit 502 may arrange the grey area in each of the plurality of sections based on the color temperature and the luminance, thereby classifying the grey area.

The counting unit 503 may count a number of grey areas included in the color temperature-luminance sections. The number of the grey areas may be a standard when determining whether the grey area is selected as an effective area for performing a white balancing.

Figure 6:
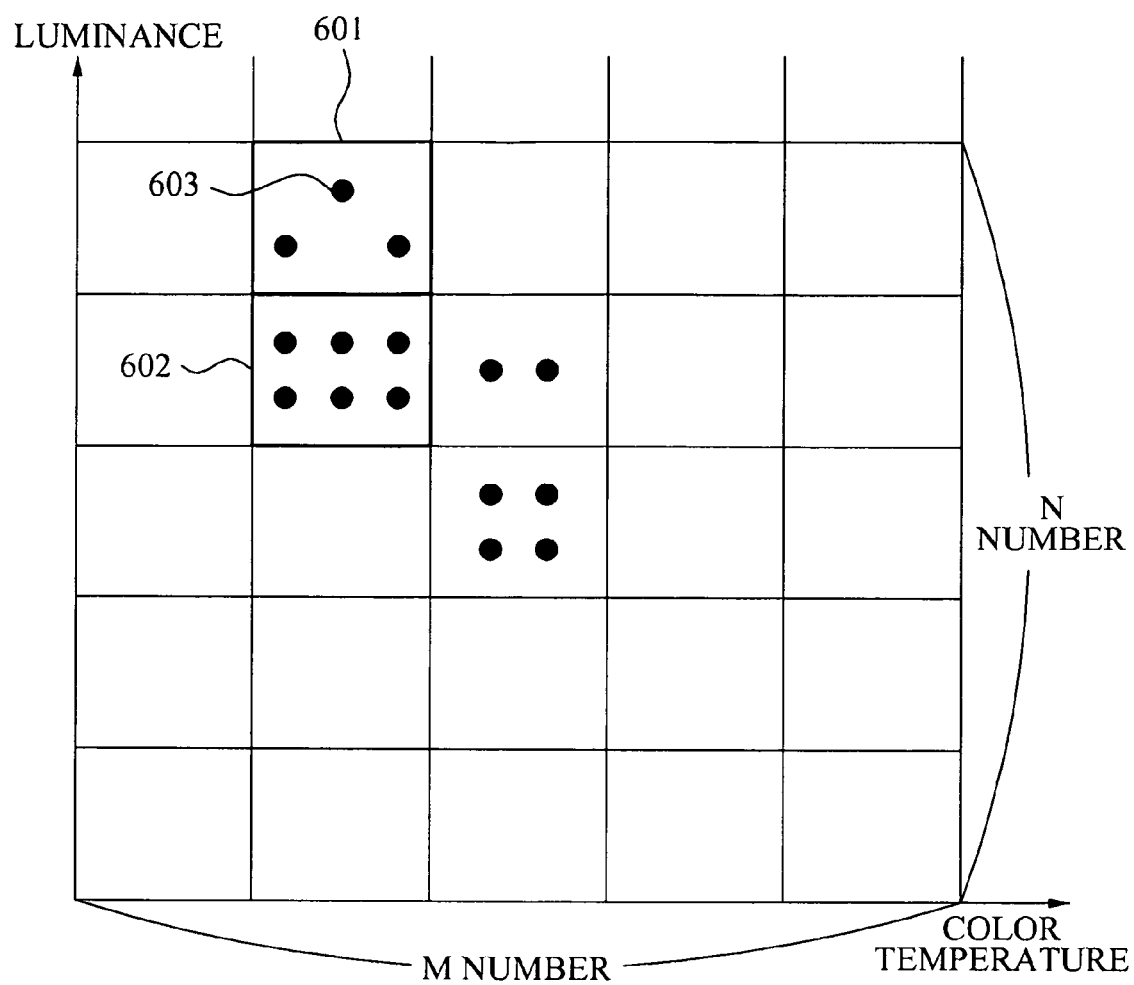
FIG. 6 illustrates a process of extracting an effective area using a color temperature-luminance section according to example embodiments.

FIG. 6 illustrates a process of extracting an effective area using a color temperature-luminance section according to example embodiments.

The effective area selecting unit 102 may select an effective area with respect to an effect of a real light source from a grey area. In this instance, the effective area selecting unit 102 may select the effective area from the grey area by setting a priority to a luminance section with respect to a color temperature-luminance section. As an example, the effective area selecting unit 102 may select a grey area included in a color temperature-luminance section where a maximum number of grey areas are included, from among a grey area included in a luminance section having a greatest luminance, as the effective area.

Referring to FIG. 6, color temperature-luminance sections are illustrated. The color temperature-luminance sections may be made up of a plurality of color temperature sections and a plurality of luminance sections. In FIG. 6, the color temperature may be divided into M sections, and the luminance may be divided into N sections. Referring to the color temperature and the luminance of the grey area, the effective area selecting unit 102 may classify the grey area into the color temperature-luminance sections.

A color temperature-luminance section 601 and a color temperature-luminance section 602 are illustrated in FIG. 6. A grey area 603 corresponds to a color temperature-luminance section. A number of grey areas 603 classified into the color temperature-luminance section 601 is three, and a number of grey areas 603 classified into the color temperature-luminance section 602 is six.

As an example, the effective area selecting unit 102 may select the effective area from the grey area based on the number of grey areas included in the color temperature-luminance section and together with luminance. In this instance, the effective area selecting unit 102 may set a priority to the luminance rather than to the number of the grey areas.

Accordingly, the effective area selecting unit 102 may select a grey area included in a color temperature-luminance section having a maximum number of grey areas, from among a grey area included in a luminance section having a greatest luminance, as the effective area.

Referring to FIG. 6, the number of grey areas 603 included in the color temperature-luminance section 601 is three, and the number of grey areas 603 included in the color temperature-luminance section 602 is six. However, luminance of the color temperature-luminance section 601 is higher than luminance of the color temperature-luminance section 602, and thus, the grey areas classified into the color temperature-luminance section 601 may be selected as the effective area. As opposed to FIG. 6, when the luminance of the color temperature-luminance section 601 is the same as the luminance of the color temperature-luminance section 602, the grey area classified into the color temperature-luminance section 602 having more grey areas may be selected as the effective area.

Figure 7:
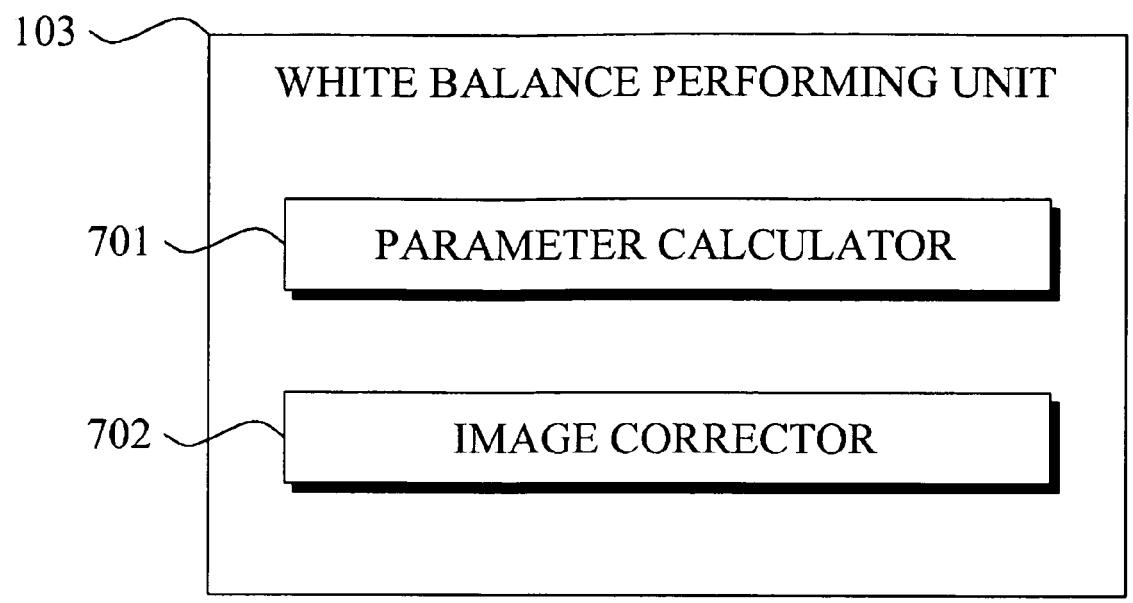
FIG. 7 illustrates a block diagram of a detailed configuration of a white balance performing unit of an auto white balance adjustment apparatus of FIG. 1.

FIG. 7 is a block diagram illustrating a detailed configuration of the white balance performing unit 103 of the auto white balance adjustment apparatus 100 of FIG. 1.

Referring to FIG. 7, the white balance performing unit 103 may include a parameter calculator 701 and an image corrector 702.

The parameter calculator 701 may calculate area data of an effective area and calculate a white balance parameter based on the area data. That is, the parameter calculator 701 may calculate the white balance parameter using image information of the effective area, as opposed to information of an entire image.

As an example, the parameter calculator 701 may calculate an average R, G, and B which are area data of the effective area and calculate a first white balance parameter for the average R and the average G and a second white balance parameter for the average B and average G. In this instance, the first white balance parameter is defined as Kr ($Kr=G_{avg}/R_{avg}$) and the second white balance parameter is defined as Kb ($Kb=G_{avg}/B_{avg}$).

The image corrector 702 may correct an input image by applying the first white balance parameter and the second white balance parameter to the entire image. In this instance, the image corrector 702 may correct the input image by applying the first white balance parameter and the second white balance parameter to the entire image, in contrast with the parameter calculator 701. The first white balance parameter and the second white balance parameter may be applied to a color channel of each of pixel data constituting the input image. In this instance, the first white balance parameter may be applied to a red channel of the pixel data and the second white balance parameter may be applied to a blue channel of the pixel data.

A red value and a blue value of the pixel data of the entire image are changed by correcting the input image, and thus white balancing may be performed with respect to the entire image.

Figure 8:
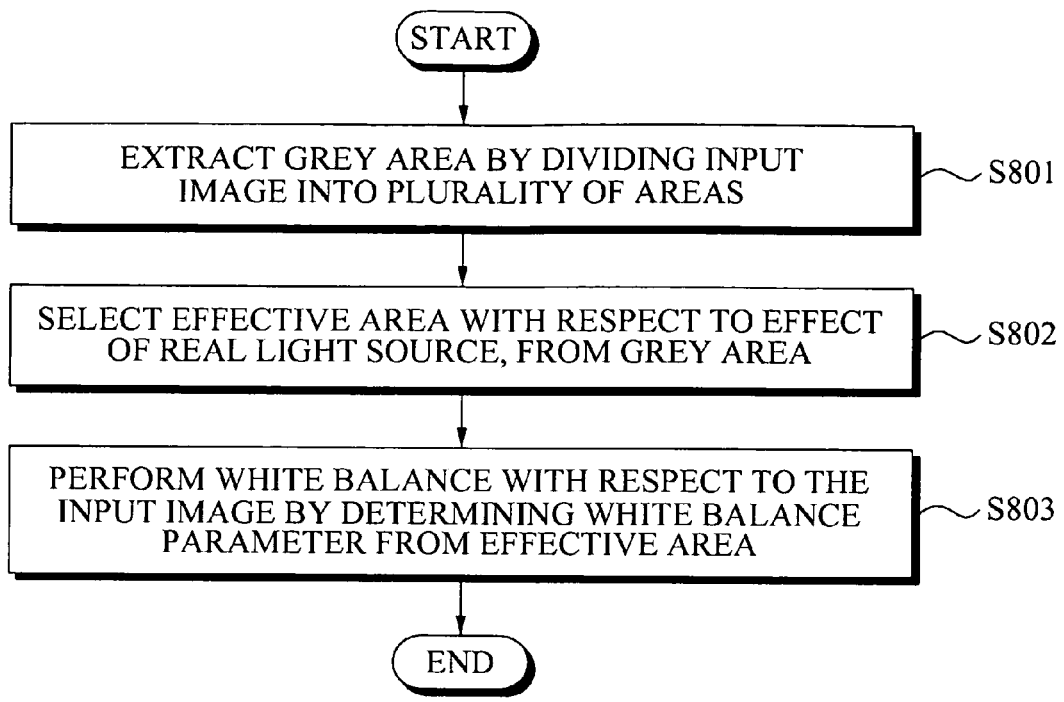
FIG. 8 illustrates a flowchart of a method of adjusting an auto white balance according to example embodiments.

FIG. 8 illustrates a flowchart of a method of adjusting an auto white balance according to example embodiments. The method of FIG. 8 may be performed, as an example, by an auto white balance adjusting apparatus.

In operation S801, the auto white balance adjusting apparatus may extract a grey area by dividing an input image into a plurality of areas.

As an example, operation 801 may include performing sampling on at least one pixel data for each of the plurality of areas, calculating area data for each of the plurality of areas using the sampled pixel data, and determining the grey area from the plurality of areas by color-space converting the area data.

As an example, when calculating the area data for each of the plurality of areas, the auto white balance adjusting apparatus may calculate average R, G, and B area data for each of the plurality of areas using an average red (R), green (G), and blue (B) of the pixel data. Subsequently, when determining the grey area from the plurality of areas, the auto white balance adjusting apparatus may convert the area data into YCbCr color-space and may determine the grey area according to at least one converted Y, Cb, and Cr.

In operation S802, the auto white balance adjusting apparatus may select an effective area with respect to an effect of a real light source, from the grey area. As an example, operation S801 may include determining color temperature information and luminance information of the grey area, classifying the grey area into color temperature-luminance sections based on the color temperature information and luminance information, and counting a number of grey areas included in the color temperature-luminance sections.

When determining the color temperature information and luminance information, the auto white balance adjusting apparatus may determine the color temperature information using Cb and Cr which are color difference data of the grey area, and may determine the luminance information using Y which is luminance data of the grey area.

In operation S802, the white balance adjusting apparatus may select an effective area from the grey area by setting a priority to a luminance section with respect to the color temperature-luminance sections. In this instance, the auto white balance adjusting apparatus may select a grey area included in a color temperature-luminance section where a maximum number of grey areas are included, from among a grey area included in a luminance section having a greatest luminance, as the effective area.

In operation S803, the auto white balance adjusting apparatus may perform white balancing with respect to the input image by determining a white balance parameter from the effective area.

As an example, operation S803 may include calculating area data of the effective area to calculate a white balance parameter based on the area data, and correcting the input image by applying the white balance parameter to the input image.

In this instance, when calculating the white balance parameter, the auto white balance adjusting apparatus may calculate an average R, G, and B of the effective area, and may calculate a first white balance parameter for the average R and the average G and a second white balance parameter for the average B and the average G. Accordingly, when correcting the input image, the auto white balance adjusting apparatus may apply the first white balance parameter to a red channel of pixel data constituting the input image and may apply the second white balance parameter to a blue channel.

Omitted description of FIG. 8 may be appreciated from the descriptions with reference to FIGS. 1 through 7.

According to example embodiments, there may be provided a method and an apparatus that selects a grey area, which is affected by a real light source, as an effective area, and adjusts a white balance using image information of the effective area, thereby improving an effect of the white balance.

According to example embodiments, there may be provided a method and an apparatus that classifies grey area according to color temperature and luminance of the grey area, and adjusts white balance using data having high luminance and having high distribution of the color temperature, thereby improving an effect of the white balance.

Also, the auto white balance adjusting method according to the above-described example embodiments may be recorded as computer readable code/instructions in/on a computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An apparatus adjusting an auto white balance, the apparatus comprising:
   a grey area extractor to extract a grey area by dividing an input image into a plurality of areas;
   an effective area selector to select an effective area with respect to an effect of a real light source, from the grey area, wherein the effective area selector comprises:
      an information determining unit to determine color temperature information and luminance information of the grey area; and
      a grey area classifying unit to classify the grey area into color temperature-luminance sections based on the color temperature information and luminance information; and
   a counting unit to count a number of grey areas included in the color temperature-luminance sections; and
   a white balance performing unit to perform white balancing with respect to the input image by determining a white balance parameter from the effective area.

2. The apparatus of claim 1, wherein the grey area extractor comprises:
   a data sampling unit to perform sampling on at least one pixel data for each of the plurality of areas;
   an area data calculator to calculate area data for each of the plurality of areas using the sampled pixel data; and
   a grey area determining unit to determine the grey area from the plurality of areas by color-space converting the area data.

3. The apparatus of claim 2, wherein;
   the area data calculator calculates average R, G, and B area data for each of the plurality of areas using an average red (R), green (G), and blue (B) of the pixel data, and
   the grey area determining unit converts the area data into a YCbCr color-space and determines the grey area according to at least one converted Y, Cb, and Cr.

4. The apparatus of claim 1, wherein the information determining unit determines the color temperature information using Cb and Cr which are color difference data of the grey area, and determines the luminance information using Y which is luminance data of the grey area.

5. The apparatus of claim 1, wherein the effective area selector selects an effective area from the grey area by setting a priority to a luminance section with respect to the color temperature-luminance sections.

6. The apparatus of claim 5, wherein the effective area selector selects a grey area included in a color temperature-luminance section where a maximum number of grey areas are included, from among a grey area included in a luminance section having a greatest luminance, as the effective area.

7. The apparatus of claim 5, wherein the white balance performing unit comprises:
    a parameter calculator to calculate area data of the effective area to calculate a white balance parameter based on the area data; and
    an image corrector to correct the input image by applying the white balance parameter to the input image.

8. The apparatus of claim 7, wherein the parameter calculator calculates an average R, G, and B of the effective area, and calculates a first white balance parameter for the average R and the average G and a second white balance parameter for the average B and the average G.

9. A method of adjusting an auto white balance performed by an auto white balance adjusting apparatus, the method comprising:
    extracting a grey area by dividing an input image into a plurality of areas;
    selecting an effective area with respect to an effect of a real light source, from the grey area, wherein the selecting of the effective area comprises:
        determining color temperature information and luminance information of each of the at least one grey area; and
        classifying the grey area into color temperature-luminance sections based on the color temperature information and luminance information; and
    counting a number of grey areas included in the color temperature-luminance sections; and
    performing white balancing with respect to the input image, using the auto white balance adjusting apparatus, by determining a white balance parameter from the effective area.

10. The method of claim 9, wherein the extracting of the grey area comprises:
    sampling at least one pixel data for each of the plurality of areas;
    calculating area data for each of the plurality of areas using the sampled pixel data; and
    determining the grey area from the plurality of areas by color-space converting the area data.

11. The method of claim 10, wherein;
    the calculating of the area data calculates average R, G, and B area data for each of the plurality of areas using an average red (R), green (G), blue (B) of the pixel data,
    and the determining of the grey area converts the area data into YCbCr color-space and determines the grey area according to at least one converted Y, Cb, and Cr.

12. The method of claim 9, wherein the determining of the color temperature information and luminance information determines the color temperature information using Cb and Cr which are color difference data of the grey area, and determines the luminance information using Y which is luminance data of the grey area.

13. The method of claim 9, wherein the selecting of the effective area selects an effective area from the grey area by setting a priority to a luminance section with respect to the color temperature-luminance sections.

14. The method of claim 13, wherein the selecting of the effective area selects a grey area included in a color temperature-luminance section where a maximum number of grey areas are included, from among a grey area included in a luminance section having a greatest luminance, as the effective area.

15. The method of claim 9, wherein the performing of the white balance comprises:
    calculating area data of the effective area to calculate a white balance parameter based on the area data; and
    correcting the input image by applying the white balance parameter to the input image.

16. The method of claim 15, wherein the calculating of the white balance parameter calculates an average R, G, and B of the effective area, and calculates a first white balance parameter for the average R and the average G and a second white balance parameter for the average B and the average G.

17. At least one non-transitory computer readable storage medium storing computer readable code comprising a program implementing a method of claim 9.

* * * * *